March 27, 1951  N. L. OATES  2,546,346
FISH BEHEADING MACHINE
Filed Nov. 21, 1945  4 Sheets-Sheet 1

INVENTOR.
NORFORD L. OATES
BY
Reynolds & Beach
ATTORNEYS

March 27, 1951 N. L. OATES 2,546,346
FISH BEHEADING MACHINE
Filed Nov. 21, 1945 4 Sheets-Sheet 2

Fig. 2

INVENTOR.
NORFORD L. OATES
BY
Reynolds H Beach
ATTORNEYS

March 27, 1951 N. L. OATES 2,546,346
FISH BEHEADING MACHINE
Filed Nov. 21, 1945 4 Sheets-Sheet 4

INVENTOR.
NORFORD L. OATES
BY
Reynolds & Beach
ATTORNEYS

Patented Mar. 27, 1951

2,546,346

UNITED STATES PATENT OFFICE 2,546,346

FISH BEHEADING MACHINE

Norford L. Oates, Seattle, Wash., assignor to Smith Cannery Machines Company, Seattle, Wash., a corporation of Washington Application November 21, 1945, Serial No. 629,979

25 Claims. (Cl. 17—4)

In preparing fish such as salmon for canning, it is necessary to remove the head back to and including the gill cover and the pectoral girdle, and usually there are removed also the pectoral fins. Because the fish is of large cross section just behind the head, and the meat there is of high quality, it is of extreme importance that no more of the meat be removed with the head than is absolutely necessary. On the other hand, the quality of the pack is reduced if there be included any appreciable quantity of bony matter, such as is found in the vicinity of the gills, consisting principally of the gill case and the pectoral girdle. On the one hand, a small fraction of an inch of excess flesh removed and wasted with the head of each fish, when multiplied by the hundreds of thousands of fish packed even by a single cannery in a single season, produces an aggregate wastage of thousands of cases of fish. On the other hand, inclusion of large bony structure down grades the pack, and causes loss of value. It is seen to be of extreme importance that the head be removed with a high degree of accuracy.

It will be understood that the fish are normally opened and cleaned, subsequent to beheading, by fish cleaning and dressing machines which operate at speeds of the order of one hundred fish a minute, and into which the fish are fed immediately after they are beheaded, as part of a continuous operation. Beheading by hand is wholly impractical, and indeed, it is impractical, and dangerous, to attempt even to locate fish by hand with respect to a beheading knife operating at any such speed. It is necessary to locate them only approximately at a point distant from the knife, and to rely upon mechanical means to effect their positioning in exact registry with the beheading knife by the time the fish reach the beheading point, or more generally speaking, it is necessary to produce such relationship, in time and space, between relative beheading movement of the fish and knife, considering also the advance of the fish, as will effect such beheading movement at the instant when the entire head of the fish is disposed at one side of the knife, and substantially all its body is disposed at the other side thereof.

Were the fish being butchered all of a given size, the problem of accurately beheading them would be greatly simplified, though by no means wholly eliminated. It happens that the fish are of varying sizes. Some will range up to twenty or twenty-five pounds, while others will be only four or five pounds. It is impossible to sort the fish out according to size, consequently any machine operating upon the fish must be self-adapting to the random sizes of fish, just as they happen to reach the machine.

Each such fish has certain bony excrescences in the vicinity of its gills, among which are the pectoral girdle, which lies just below the surface of the skin and just at the rear margin of the gill case, and the gill cover or the gill case itself, and in a sense, the pectoral fins. Such a bony excrescence—preferably the pectoral girdle—serves as a convenient gauge by which to locate the point where the fish is to be beheaded, and by which to locate the fish accurately with relation to a beheading device, such as a knife or knives. Such bony excrescence can be engaged by a suitably shaped and disposed gauge device or feeler, which forms part of the machine, and which if pressed towards the side of the fish will depress the skin and come into engagement with the pectoral girdle. Such engagement can serve to locate the fish, or it can serve to effect movement, either of the fish into the path of a beheading element, or of mechanism associated between the feeler means and a header knife, to cause the beheading movement to occur at the precise line or location on the fish which best removes the bony parts, and which best leaves the wanted fleshy parts.

According to the present invention, such engagement of a feeler with a bony excrescence of the fish is effected by relative movement of the feeler and fish, in skin-depressing relation, toward the head end of the fish, until the bony excrescence and the feeler are engaged. Such engagement entrains and times action of such nature as will, at the proper time, effect beheading movement, either of the fish transversely of its length and relative to a fixed knife, or of a knife or knives transversely of and relative to the fish, in distinction to other arrangements wherein such engagement with a bony excrescence effects a bodily shifting of the fish in the direction of its snout end.

The general object of the invention is to provide mechanism and a method wherein the beheading action is timed and located to occur along the intended line across the fish, through the agency of feeler means engageable with a bony excrescence of the fish which, itself, bears a definite close relationship to the intended line of the beheading cut.

It is an object of the present invention to provide a beheading machine for the purposes indicated, and operating in the manner generally described above, wherein the fish may be beheaded while it is traveling in the direction of its own length, and usually tailward in that direction, by means engaging a caudal portion of the fish.

The beheading of a fish in the manner and under the conditions just indicated, permits the attainment of another object, namely, to permit the beheaded body to continue its advance without interruption or hesitation, the severed head being held back by the knife or knives, and its complete severance being thereby insured, after which it may be dropped into a chute for disposal.

It is also an object in such a beheading machine to provide mechanism which is self-adapting to varying sizes of fish, so that in the largest measure possible all sizes of fish, as they come to the machine, are properly beheaded, with minimum inclusion of bony structure, and with maximum inclusion of usable flesh.

Previous beheading knives, at least such as have been shaped to follow the rear contour of the pectoral girdle, and perhaps to remove the pectoral fins, have usually been either fixed, with provision for moving the fish towards and past the knife, or have been rotary, to engage and pass through a fish as the fish rests upon a table. It is a further object of the present invention to provide a reciprocable knife, and preferably, a cooperating shearing pair of such knives, which will positively shear off and sever the head from the passing body.

While there are numerous other objects of the present invention, particularly such as relate to mechanical and operational details, such further objects will appear hereafter as this description progresses, and sufficient has been said to indicate the general objects of the invention, and to afford a sufficient understanding for the specification which follows.

In the accompanying drawings the principles of the present invention have been illustrated primarily in one particular form or embodiment. While this is a representative form, it is not necessarily the preferred form. It must be remembered that, particularly in collateral details, this is not the only feasible form, and that the invention is not to be restricted to this particular form, nor to any particular form, other than as is required by the language of the claims which will be found at the end of this specification.

Figure 1 is a general side elevation.

Figure 4 is a front elevation, illustrating a part of the machine, and showing its adaptability to different sizes of fish.

In this particular form of the machine the fish is advanced in the direction of its length tailward, between two oppositely disposed and properly shaped beheading knives, and the fish in its movement engages, by at least one of the bony excrescences referred to above, a feeler or gauge member to move the latter, and this feeler is so related in space and time, with relation to the movement of the fish, that just as the fish reaches proper beheading position with relation to the general plane of the knives, these knives are caused to move inwardly or together, to sever the head from the fish. The fish, being engaged by its caudal portion, continues its tailward movement without interruption, leaving the head behind. The knives are moved outwardly to be reset, ready for the next fish.

Figure 5:
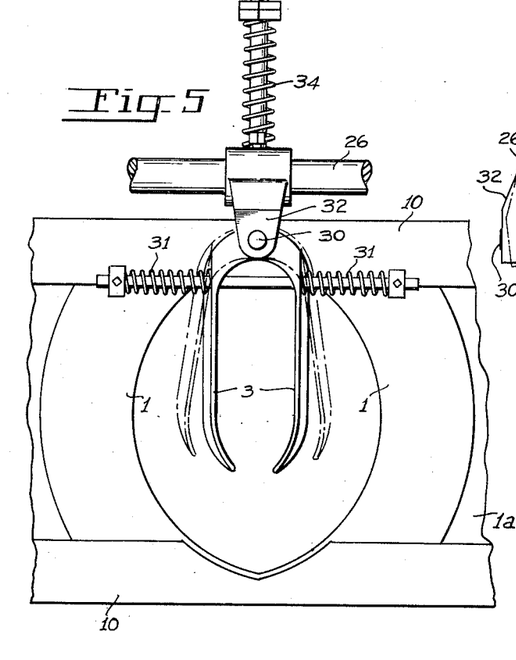
Figure 5 is an enlarged front elevation of the feeler mechanism by which the beheading operation is gauged or initiated.

Two complemental beheading knives 1 are employed in the machine herein shown. These are supported by slides 1a, to be thereby guided in the fixed frame 10 for movement past one another in shearing relationship, in opposite directions in a common general plane. However, each knife is so curved, departing from a true plane, to an extent to follow the general curvature at the rear of the pectoral girdle of a fish, and, if desired, to remove also the pectoral fin of such a fish, as is common practice. Their cutting edges, as may be seen, for example, in Figure 5, are bowed in the general plane of the knives, so that the thick body of a fish may pass between them, and the knives may then move together and through the fish at the proper beheading point, with a minimum of reciprocatory movement. These cutting edges might be multiple-pointed, if desired, and this is common practice.

Such movement of the knives is caused by any convenient means, such, for instance, as the springs 11 acting through bell-crank levers having the arms 12 and 13 engaging pins 14 upon the respective knives. These bell-crank levers 12, 13 are pivoted to the frame at 15, and each arm 13 carries a cam roller 16 with which, at timed intervals, the cam risers 17 of a cam disc 18 are engageable. These risers 17 serve to withdraw the knives after inward reciprocation, and coincidentally to recompress the springs 11. The knives are held thus withdrawn, and the springs thus compressed, by lock levers or dogs 2, pivotally mounted at 20 upon the frame and urged into locking position by light springs 21. Each of these lock levers engages within a notch 18 in a reciprocatory rod 19 which guides and moves with the respective knives.

However, the springs 21, in conjunction with the shape of the dogs 2 and the notches 18 in which they engage, are not intended to be wholly sufficient to hold the knives retracted, except with the assistance of a trip arm 22, pivoted at 23. This trip arm is connected by a link 24 to a short lever arm 25 upon a rock shaft 26, which connects the trip arms 22 at opposite sides of the machine to a tripping device. This tripping device, as will shortly appear, is actuated by engagement with and movement of the fish through the machine. Before describing it in detail, however, it will be convenient to describe how the fish is advanced and moved through the machine.

Figures 1, 4:
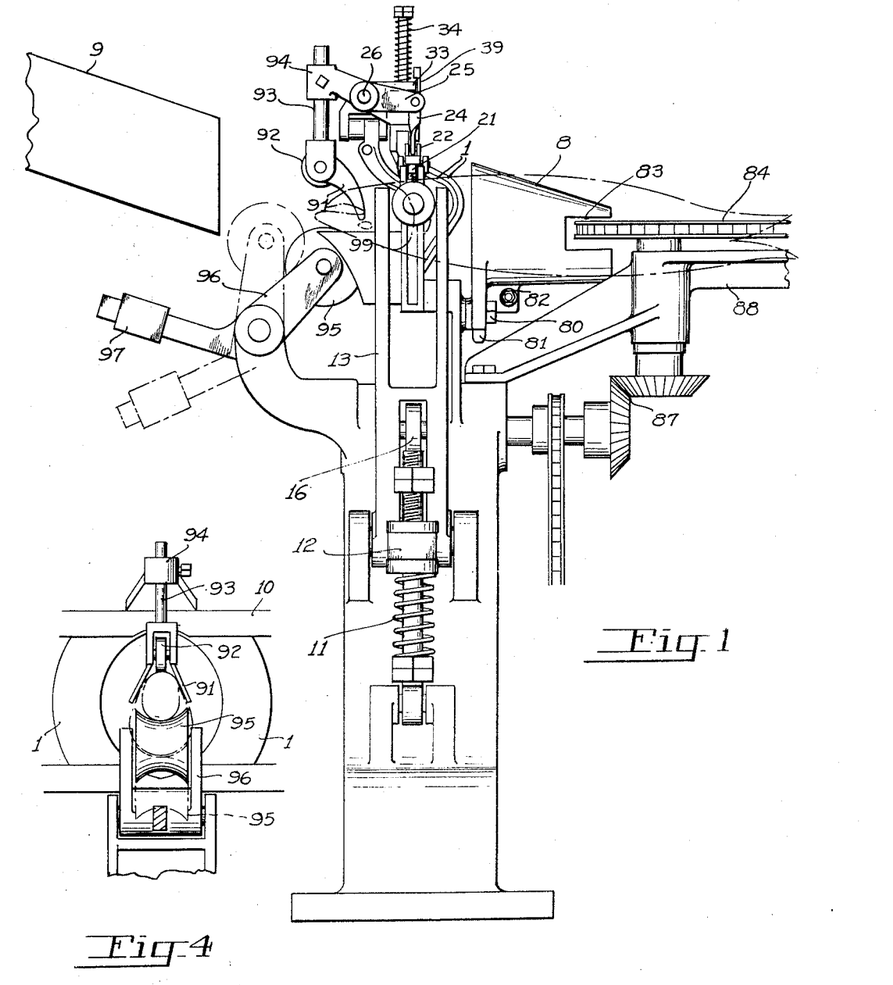
Figure 2:
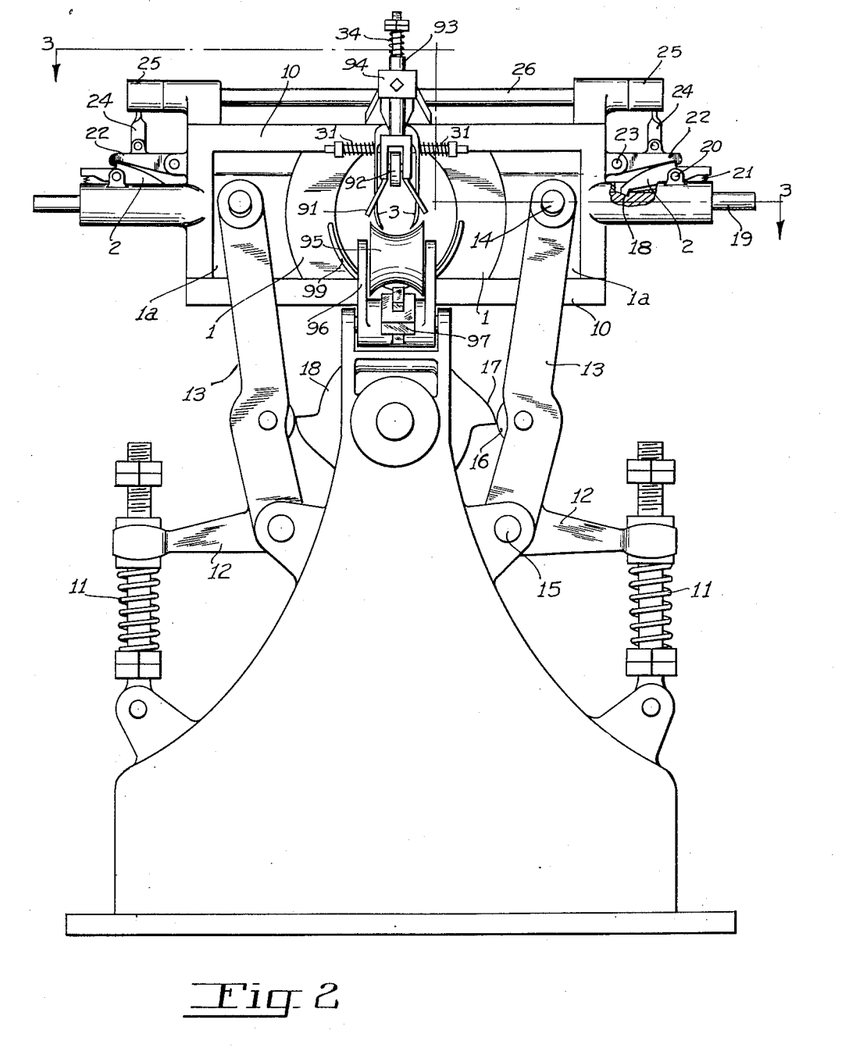
Figure 2 is a general front elevation, of the beheading machine.

The fish are fed to the beheading machine into a temporarily arrested position tail forward, and preferably belly upward, by any suitable means, typified by the inclined trough 9. In advance of the knives is located a vertically adjustable hold-down fork 91, carrying also a roller 92. This can be vertically adjusted by moving its vertical supporting post 93 in the fixed guide 94. Cooperating with this fixed upper guide is a yieldable lower guide, which, in the present instance, takes the form of a grooved roller 95 mounted upon one end of a pivoted arm 96, the opposite end of which carries a weight 97, or is otherwise yieldably urged downwardly, to throw upwardly the grooved roller 95. A fish, engaging first the roller 95, depresses the roller according to its weight and size, as is suggested in Figure 4, and the roller urges the fish upwardly against the fixed forked hold-down 91. A short fixed trough 99 serves as a final guide for a fish to insure that it is directed through the opening between the knives.

Figure 3:
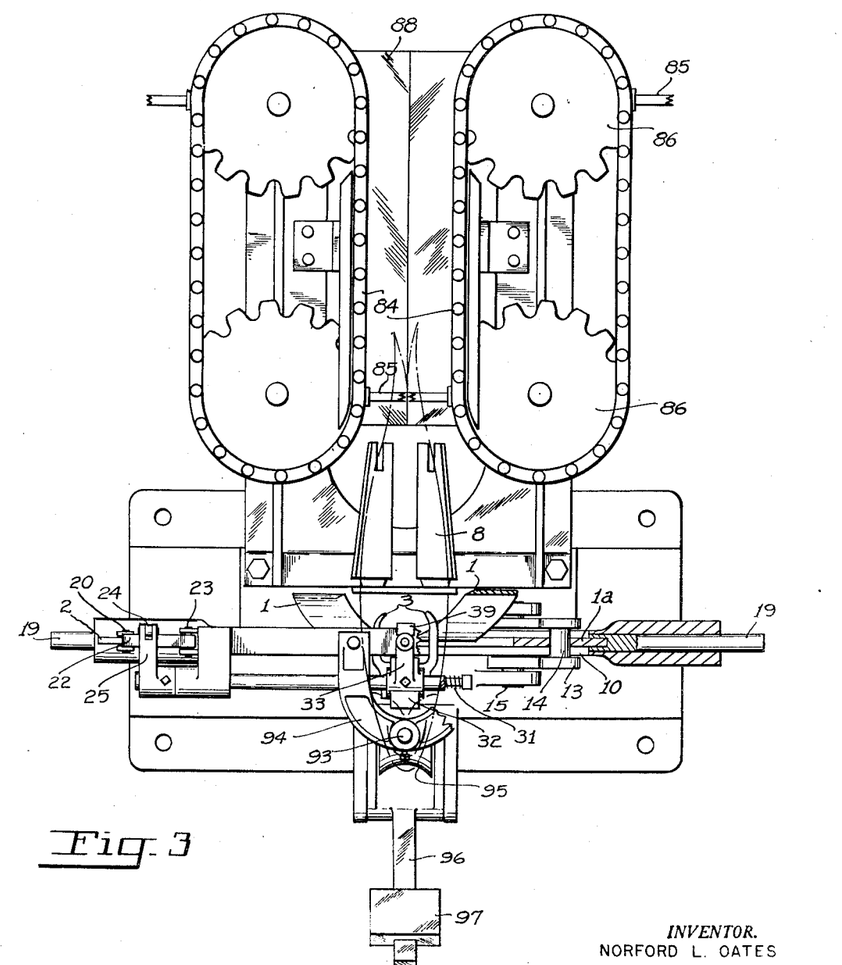
Figure 3 is in part a plan view, and in part a section, the viewpoint being generally indicated by the line 3—3 of Figure 2.
Figure 7:
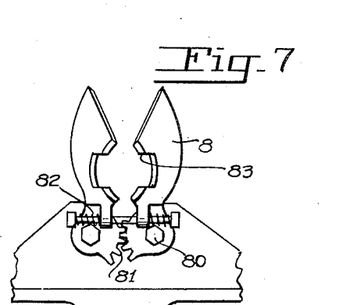
Figure 7 is a rear view of a fish snubbing funnel at the rear side of the beheading machine.

In the machine shown, but not necessarily in all forms, the fish's movement through the machine is completed by positively engaging its tail end, and pulling it on through the machine. When the fish is advanced tailward in the manner just described, the tail end of the fish passes between the separated knives 1, and its tail end enters and passes somewhat through a snubber or funnel (see Figure 7), consisting of two shaped plates 8 each pivoted to the frame at 80 and connected by gear means 81 to swing oppositely and conjointly. At this point, the fish, sliding by gravity and/or its momentum, is arrested by the snubber. Normally they are held close together by a light spring 82. Each is slotted at its smaller end, as indicated at 83, in order that a feed chain 84, one at each side of the fish, at properly timed intervals, may engage with the caudal portion of the fish a pair of spikes 85 (see Figure 3) carried by such chains. These sprocket chains 84 are disposed in horizontal planes at opposite sides of the path of the fish, upon sprocket wheels 86, one of which is driven by means indicated at 87 in synchronism with the rotation of the cam disc 18 previously described. To prevent the fish from falling through between the chains a trough 88 is provided to support its back, which is lowermost. As is evident, the fish, no matter in what timing it may be fed to the machine, is pulled through by the positive engagement of its caudal portion by the spikes 85 as the latter arrive and grip the fish, which is stopped momentarily by the snubbers 8. By this engagement of the spikes 85 with the fish the fish is pulled tailward through the machine, the snubber plates 8 opening to permit the fish to pass.

Interposed in the path of the fish, just in advance of the beheading point represented by the general plane and shape of the knives 1, there is located a feeler which takes the form of two fingers 3 (see Figures 5 and 6) pivoted at 30 and urged together, as by the light springs 31. In Figure 5 these fingers of the feeler are shown in full lines in their position of maximum approach, and in dot-dash line in a wider spread position. It is their function to permit the tail portion of the fish to pass through between them, but to engage the body of the fish. As the fish moves or is drawn tailward through the machine, as has already been described, these fingers, which are shaped (see Figure 6) to depress the flesh of the body portion of the fish and to fit generally about the rear edge of the bony excrescence in the vicinity of the fish's gill, engage this bony excrescence, since they are urged inwardly with sufficient force to depress the skin, but they will not readily pass over the rather sharp ledge which this bony excrescence, even though below the skin, presents to the fingers. In consequence, as the fish continues its advance the feelers 3 are swung somewhat in the direction of the movement of the fish, as is indicated by the dot-dash position of Figure 6. In order to permit such movement the pivot 30 is pivoted upon an arm 32 which is fastened upon the rock shaft 26, and a second arm 33 projects laterally from the rock shaft and is urged downwardly by a spring 34. The vertically pivoted arm 33 eventually engages and is stopped by a vertically adjustable stop 39, which gauges the point where the feelers 3 stop their swinging movement, and by their spreading transversely, in opposition to springs 31, permit the fish to continue on.

The rock shaft 26, as has already been indicated, is connected to the trip arm 22. The spring 34 serves not only to retain the feeler 3 in proper position for engagement of a fish, and to yield to permit swinging of the feeler in following movement of the fish, but this spring 34 serves also to insure the engagement of the trip arm 22 with the lock lever 2 to retain the latter in engagement with the notch 19 and thus to hold the knives retracted, notwithstanding the stored force in the springs 11. However, upon such rocking movement of the rock shaft 26 under the influence of the feelers 3, as the latter are swung by the advancing fish, the trip arm 22 is raised, and this releases the locking lever 2 and permits the knives 1 to be moved inwardly, under the influence of the force previously stored in the springs 11. This force is sufficient to move the two knives rapidly past one another, and to completely sever the trailing head of the fish. The head thus severed drops off, or being restrained by the closed knives is pulled off, and is caught and conveyed away by a suitable chute (not shown), the roller 95 being swung toward chute 9 by weight 97 to allow clearance for the head to drop by the forward edge of trough 99. The beheaded fish continues on and is discharged from the chains 84. The movement of the knives might be effected by any means which is tripped or energized by fish-induced movement of the feelers 3, and the arrangement described is only one suitable means to accomplish the desired result.

The feeler 3 must disengage the fish before the feeler moves far enough to interfere with beheading movement of the knives, as has already been made clear, or the knives must be so arranged with relation to the feeler, and vice versa, that the knives cut immediately to the rear of the feeler, while the latter remains engaged with the fish. Which mode of operation is employed is not material to this invention. Preferably, the feeler is permitted to swing to a limited extent only and then is stopped, as by engagement of the arm 32 with the stop 39 (see Figure 6).

There is, of course, some lag in the mechanical operation of the parts. The spring forces involved, and such lag, and the point of release of the feeler 3, are all so calculated in space-time relationship, that the beheading movement of the knives occurs just as the pectoral girdle reaches a point immediately in advance of the knives. The head is at one side of the knives, and substantially all the body is at the opposite side thereof. The knives thus sever the head immediately behind the bony structure, and leave all the fleshy portion on the body. The synchronization between the cam disc 18 and the drive chain 84 need only be close enough that after beheading movement of the knives, they are separated and moved outwardly sufficiently to clear a path for the next oncoming fish. Since the fish is smallest at its tail end, which is in the lead, the knives may be opening coincidentally with entrance of this small tail end of the fish through the space between the opening knives, or the opening of the knives may occur so immediately following their closure that they are fully open before the next fish arrives.

Should a fish fail to arrive in normal time sequence, the knives will have been retracted, but since the closure or beheading of the knives is dependent upon engagement of the feeler 3 by a fish passing through, the knives will merely remain open while the machine continues to run. As soon as the next fish is fed to the beheading machine, the operation will be resumed in proper timing by the engagement of the tail of such a fish by the spikes 85 in the manner shown in Figure 3.

Figure 6:
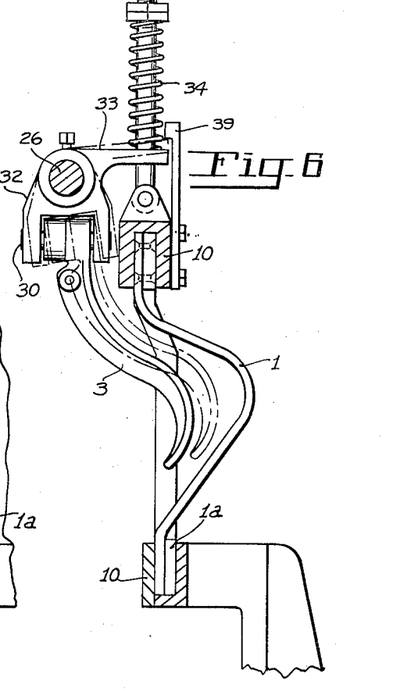
Figure 6 is a side elevation thereof, associated parts of the machine being shown in section.
Figure 8:
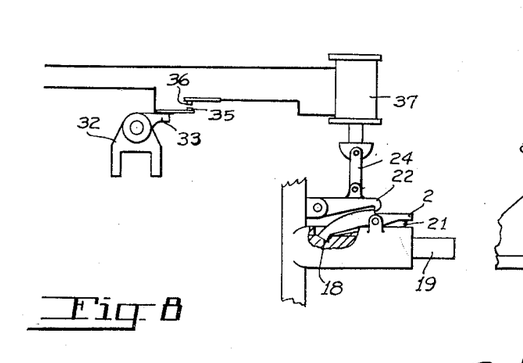
Figure 8 is a diagrammatic showing of a modified arrangement.

The tripping as described above is mechanical. However, it may well be arranged to be accomplished otherwise, as for example, electrically. An electric trip is shown in Figure 8. Upon the arm 33 is carried a contact 35 which in the normal position of the feeler, corresponding to the full-line position of Figure 6, is out of contact with the complemental fixed contact 36. Upon swinging of the feeler to the dot-dash line position of Figure 6, contact is established between the contact points 35 and 36, thereby energizing a solenoid 37 and pulling upwardly the trip arm 22 to release the locking dog 2. Suitable lost-motion or time-delay devices may be incorporated, either in the circuit to or in the mechanical connections from the solenoid 37, if such means are desired or required. Instead of operating a trip to release the knives, the solenoids might be arranged to effect closing movement of the knives, upon energization by the closing of switch 35, 36, or to effect opening movement thereof—in either case against the force of springs 11.

As will be evident, the essence of the invention lies primarily in the effecting of a beheading movement (whether the moving element is the fish with relation to a fixed knife or other beheading means, or is a knife or knives with relation to a fish which can be considered as instantaneously fixed) and the gauging of this movement by a feeler member shaped and disposed in a fish's path of advance to be engaged and moved by a bony excrescence of the fish, and thereby to effect the beheading action so that it comes at precisely the correct moment in the advance of the fish, the latter being advanced by engagement with its caudal portion. On the other hand, it is not essential that the fish move tailward, for if the fish were moving in the direction of its snout, the feelers might move in the same direction, but faster than the fish, and by their engagement and movement with the fish could trip and operate a beheading knife at the proper time with relation to the movement of the fish. Moreover, the fish is not necessarily moving in the direction of its own length, for if it be true that the feeler could engage the bony excrescence while the fish is moving towards its snout end; so, too, such a feeler could engage such a bony excrescence while the fish, placed transversely of a feed table, is moving in a direction transverse to its length. I desire to emphasize that the invention is not to be restricted to movement of the fish, nor to its movement in any particular direction or position, nor by any particular means, but rather to the effecting of the beheading action through the interposition of a feeler which engages a bony excrescence of the fish, and which by that engagement, and by its relationship to the beheading element, effects the beheading movement at the proper instant, to behead the fish at precisely the correct location.

I claim as my invention:

1. In a fish beheading machine, the combination of: a beheading element; means to advance a fish tailward towards said beheading element; means to effect relative beheading movement between such a fish and said beheading element, upon arrival of the fish in intended disposition with respect to a selected beheading point; feeler means disposed in the path of the fish's advance, for engagement with and movement by a bony excrescence in the vicinity of the fish's gill, when the fish reaches a position which has a predetermined space-time relation to the beheading point, and means operatively connecting said feeler means to said means to effect beheading movement, to initiate beheading movement in time to behead the fish as it reaches, in its advance, correct beheading position.

2. In a fish beheading machine, the combination of: means to advance a fish tailward through a fixed path; feeler means disposed in said path, and formed and arranged for engagement and movement by a bony excrescence upon the fish in the vicinity of its gill; a beheading knife disposed generally in a plane intersecting the fish's path of advance; and means governed by such movement of the feeler means to effect relative beheading movement of the advancing fish and the knife at such time as the fish reaches a point in its advance wherein substantially its entire body, but not its head, has passed the plane of the beheading knife.

3. In a fish beheading machine, the combination of: a beheading knife guided for movement generally in its own plane; means so to move said knife; means to advance a fish tailward in a path intersecting the knife's path, a feeler disposed in the fish's path, in advance of the knife's path, and formed and disposed for engagement and movement by a bony excrescence upon the fish in the vicinity of its gill; and means operatively connecting the feeler and the knife-moving means, to time beheading movement to occur just as the fish reaches a point where its head but no substantial portion of its body is disposed behind the path of the beheading knife.

4. In a fish beheading machine, the combination of: means to advance a fish in the direction of its length; a beheading knife disposed generally in a plane intersecting the path of advance of the fish; means to effect relative movement of the knife and fish, in the plane of the knife, to behead the fish; and timing means governing such beheading movement to occur as the fish's neck in its advance reaches the plane of the knife, said timing means including a feeler relatively movable over the fish, as the latter advances, until engaged by a bony excrescence in the vicinity of the fish's gill, and means operatively connecting the means to effect beheading movement, and said feeler, to operate the former upon engagement of the latter with such bony excrescence.

5. In a fish beheading machine, the combination of: means to advance individual fish in a definite path to and past a beheading point; a beheading element at that point disposed at one side of the fish's position as it arrives at such point; means to effect relative beheading movement of the fish and beheading element when the fish arrives at a point wherein its head is disposed at one side, and substantially its entire body at the other side, of the beheading point, said means including a feeler engageable with a bony excrescence in the vicinity of the fish's gill, to be moved by such engagement as the fish advances, and mechanism actuated by such movement of the feeler to effect such beheading movement.

6. In a fish beheading machine, the combination of: a beheading knife; means to dispose a fish transversely of the general plane of said knife, with its head at one side and its body at the other side of such plane; means to effect relative beheading movement of the knife and fish, including means relatively movable with respect to the fish, towards its head end, formed and disposed to engage a bony excrescence of the fish in the vicinity of its gill, and operable by such engagement to effect such beheading movement.

7. In a fish beheading machine, the combination of: a beheading element; means to advance a fish tailward past said beheading element; means to effect relative beheading movement between said fish and said element; means to govern the timing of said beheading movement in relation to the point reached by the fish in its advance, and feeler means disposed in the path of the fish's advance, for engagement with and movement by a bony excrescence in the vicinity of the fish's gill, and operatively connected to said timing means, for operation of the latter and consequently of the beheading element, as the fish reaches correct registry with the beheading element.

8. In a fish beheading machine, the combination of: a beheading element; means to advance individual fish tailward past said beheading element; means to effect relative beheading movement between said fish and said element; normally locked means to prevent such beheading movement; a feeler disposed in the path of the fish's advance, in advance of said element, and shaped to engage a bony excrescence of the fish in the vicinity of its gill, as it advances, and to be moved thereby; and means operatively connecting said feeler to said locked means to release the latter upon such fish-induced movement of said feeler.

9. In a fish beheading machine, the combination of: a beheading knife guided for reciprocation in its own general plane; means to advance individual fish tailward past said knife; spring means to advance said knife past the fish to behead the latter; means synchronized with the fish-advancing means to return the knife to its ready position, and to restore the spring force, following each beheading advance of the knife; locking means to retain the knife in such ready position, and lock-releasing means including a feeler disposed in the fish's path just ahead of the beheading knife for engagement and releasing movement by a bony excrescence of the fish in the vicinity of the gill.

10. In a fish beheading machine, in combination with means to advance individual fish tailward through a definite path, a pair of cooperating beheading knives disposed at opposite sides of such path, and guided for conjoint movement thereacross to behead the fish, means to time such beheading movement including a forked feeler disposed somewhat in advance of the beheading point in position to engage opposite sides of the fish, and shaped to engage the fish's pectoral girdle as the fish is advanced, mounting means for said feeler allowing it to move with the fish when so engaged, and an operative connection between said feeler and the knives to effect beheading movement of the latter just as the fish arrives in proper relation to the beheading point, and further means to withdraw the knives prior to arrival of the next fish at the beheading point.

11. In a fish beheading machine, in combination with means to advance individual fish tailward through a definite path, a pair of cooperating beheading knives disposed at opposite sides of such path, and guided for conjoint movement thereacross to behead the fish, means to time such beheading movement including a forked feeler disposed somewhat in advance of the beheading point in position to engage opposite sides of the fish, and shaped to engage the fish's pectoral girdle as the fish is advanced, yieldable means urging the opposite sides of the feeler towards the fish, to depress the skin until engaged by said pectoral girdle, and permitting yielding to accommodate fish of various sizes, mounting means for said feeler allowing it to move with the fish when so engaged, and an operative connection between said feeler and the knives to effect beheading movement of the latter just as the fish arrives in proper relation to the beheading point, and further means to withdraw the knives prior to arrival of the next fish at the beheading point.

12. In a fish beheading machine, in combination with means to advance individual fish tailward through a definite path which includes a beheading point; a beheading knife disposed and guided for reciprocation in transverse plane at the beheading point; means timed with the fish-advancing means to retract said knife, following each beheading movement before arrival of the next fish at the beheading point; means to lock said knife in retracted position; spring means loaded by such retraction, for subsequent beheading movement of the knife and held so loaded by said locking means; a feeler guided for movement along the fish's path of advance, and disposed and shaped for engagement by the fish's pectoral girdle, as the fish reaches a point in its advance close to the beheading point; and means operatively connecting said feeler with said locking means, to release the latter upon such fish-induced movement of the feeler.

13. A fish-beheading machine as in claim 12, characterized in that the fish-advancing means supports the fish belly-uppermost, and in that the feeler is disposed above and forked to engage opposite sides of the fish, and yieldable means cooperating with said feeler and urging the fish upwardly into engagement with said feeler.

14. In a fish beheading machine, the combination of: means to positively engage and advance a fish tailward; a beheading knife disposed at one side of the fish's path, and guided for movement across such path, to sever its head; and feeler means disposed in the path of the fish, close to said knife, in position to depress the skin of the fish and to engage a bony excrescence in the vicinity of the gill, said feeler means being mounted for movement by such engagement, and being operatively connected to said knife to effect beheading movement thereof upon such movement of the feeler means.

15. In a fish beheading machine, the combination of: means to positively engage and advance a fish tailward; a beheading knife disposed at one side of the fish's path, and guided for movement across such path, to sever its head; and feeler means disposed in the path of the fish, close to said knife, in position to depress the skin of the fish and to engage a bony excrescence in the vicinity of the gill, said feeler means being mounted for movement by such engagement, and being operatively connected to said knife to effect beheading movement thereof upon such movement of the feeler means; and means synchronized with said fish-advancing means to retract said knife prior to arrival of the next fish for presentation thereto.

16. In a fish beheading machine, means to advance individual fish to and past a beheading point, a knife shaped to sever the fish's head closely behind its pectoral girdle, means guiding said knife for beheading movement relative to the fish so fed, and means engageable with the fish's side and actuable by skin depressing engagement with the pectoral girdle to time beheading movement of said knife to occur as the fish arrives in position such that substantially its entire head lies at one side of the knife's path, and substantially the entire body of the fish lies at the opposite side of the knife's path.

17. In a fish beheading machine, means to advance individual fish tailward in a definite path, a beheading element disposed at one side of the fish's path, for relative reciprocation transversely into beheading engagement with the fish, means to restrain such beheading movement, and means to override said restraining means to permit the beheading movement, comprising a pair of spaced-apart feeler fingers disposed to engage opposite sides of an advancing fish, and yieldably separable for advance thereof, but engageable with bony excrescences at each side in the vicinity of the gills, mounting means for said feeler fingers yieldable to permit their movement in the direction of the fish's advance when so engaged, and means operatively connecting said feeler fingers and said restraining means, to release the beheading element for reciprocation into beheading position upon such movement of the feeler fingers.

18. In a fish beheading machine, a pair of knives normally spaced apart for passage of a fish, and guided for movement across the path of advance of such a fish, means to restrain such beheading movement of said knives, a hold-down device fixedly positioned in advance of such knives, upwardly acting and yieldably mounted presser means cooperating with said hold-down device to engage and guide each oncoming fish, of whatever size, a fish-guiding funnel at the distant side of said knives, laterally expansible to accommodate fish of varying sizes, positive means to engage the tail portion of a fish which projects within said funnel, and to advance the same, and feeler means disposed between said hold-down and presser means, and the knives, in position to be engaged by a bony excrescence of the fish in the vicinity of the gill, and operatively connected to said knife-restraining means to release the knives for beheading movement upon such engagement of the feeler means by the fish.

19. A fish beheading machine as in claim 18, wherein the feeler means comprises a pair of fingers spaced apart to engage opposite sides of a fish, and pivotally mounted to spread transversely, spring means urging said fingers inwardly, further mounting means permitting pivotal conjoint swinging of the fingers in the direction of advance of the fish, stop means limiting such swinging, and spring means to return said fingers to initial position following such swinging.

20. A fish beheading machine as in claim 18, wherein the fish-guiding funnel is slotted lengthwise of its discharge end, and wherein the positive fish advancing means comprises chains at opposite sides of and extending beyond said funnel, and spikes projecting therefrom, and entering through said slots to pierce a fish held in said funnel.

21. A machine for beheading fish, which comprises a supporting device operable to hold positively the caudal portion of the fish, a gauging device engageable with the pectoral portion of the fish, means operable to move apart such supporting and gauging devices lengthwise of the fish to engage the latter device with and to move it by a bony excrescence in the vicinity of the gill, fish beheading means, and means responsive to the engagement of said bony excrescence and operable thereby to effect relative beheading movement between the fish and the beheading means as a result of such movement of said gauging device.

22. In a fish beheading machine, the combination of: a beheading knife guided for reciprocation in its own general plane; means to advance individual fish tailward past said knife; spring means to advance said knife past the fish to behead the latter; means synchronized with the fish-advancing means to return the knife to its ready position, and to restore the spring force, following each beheading advance of the knife; locking means to retain the knife in such ready position, said synchronized means including a pivoted knife-actuating arm movable by said spring means and whose swinging end is connected to said knife, a cam follower mounted on said arm, a cam rotated synchronously with said advancing means and engageable with said cam follower to swing said arm to return said knife to its ready position; and lock-releasing means including a feeler disposed in the fish's path just ahead of the beheading knife for engagement and releasing movement by a bony excrescence of the fish in the vicinity of the gill.

23. In a fish beheading machine, the combination of: a beheading knife guided for reciprocation in its own general plane; means to advance individual fish tailward past said knife; spring means to advance said knife past the fish to behead the latter; means synchronized with the fish-advancing means to return the knife to its ready position, and to restore the spring force, following each beheading advance of the knife; locking means to retain the knife in such ready position, said synchronized means including a bell crank having a lever engaged by said spring means and having a knife-actuating arm movable by said spring means engaging the crank's lever and which arm's swinging end is connected to said knife, a cam follower mounted on said arm, a cam rotated synchronously with said advancing means and engageable with said cam follower to swing said arm to return said knife to its ready position; and lock-releasing means including a feeler disposed in the fish's path just ahead of the beheading knife for engagement and releasing movement by a bony excrescence of the fish in the vicinity of the gill.

24. The machine as defined in claim 22 in which the cam's surface is formed with a riser for swinging the actuating arm to effect full return of the knife, and with a substantially flat surface portion adjoining such riser, effective to delay the swinging of the arm for a sufficient time during which the knife remains interposed between the fish's body and head to enable the advancing means to tear any shreds of flesh or skin which may continue to interconnect such head and body immediately after cutting.

25. The machine as defined in claim 22 and means engageable with the fish's tail portion and operable to locate a fish preliminarily in the machine at a point in advance of the knife, said locating means being disposed at a predetermined point with respect to the beheading knife and for presentment of the fish to the advancing means.

NORFORD L. OATES.

REFERENCES CITED

The following references are of record in the file of this patent:

UNITED STATES PATENTS

| Number | Name | Date |
| --- | --- | --- |
| 1,175,601 | Carson | Mar. 14, 1916 |
| 2,230,942 | Gibbs | Feb. 4, 1941 |
| 2,234,658 | Smith | Mar. 11, 1941 |
| 2,263,694 | Grayson | Nov. 25, 1941 |
| 2,311,176 | Hutton | Feb. 16, 1943 |
| 2,346,935 | Oates | Apr. 18, 1944 |
| 2,421,262 | Hellden | May 27, 1947 |
| 2,423,174 | Brown | July 1, 1947 |

FOREIGN PATENTS

| Number | Country | Date |
| --- | --- | --- |
| 27,148 | Norway | July 31, 1916 |